United States Patent [19]
Takemura et al.

[11] 3,854,515
[45] Dec. 17, 1974

[54] RADIAL TIRE HAVING POLYESTER CORD BREAKER

[75] Inventors: Satoshi Takemura; Mitsuaki Maeda; Noboru Sakai, all of Tokyo, Japan

[73] Assignee: Bridgeton Tire Company Limited, Tokyo, Japan

[22] Filed: June 22, 1973

[21] Appl. No.: 372,573

[30] Foreign Application Priority Data
June 28, 1972  Japan.............................. 47-64638

[52] U.S. Cl.............. 152/361 R, 57/140 R, 57/153, 152/359
[51] Int. Cl............................ B60c 9/18, D02g 3/48
[58] Field of Search........... 57/140 R, 157 S, 157 R, 57/164, 153; 152/356–359, 361 R; 28/75

[56] References Cited
UNITED STATES PATENTS

| | | |
|---|---|---|
| 3,343,363 | 9/1967 | Stow, Jr. et al................. 57/140 R |
| 3,554,260 | 1/1971 | Shoemaker et al................ 152/359 |
| 3,616,832 | 11/1971 | Shima et al......................... 152/361 |
| 3,665,994 | 5/1972 | Kovac et al........................ 152/359 |
| 3,672,423 | 6/1972 | Duduk................................. 152/356 |
| 3,690,362 | 9/1972 | Mago et al..................... 57/140 R X |

Primary Examiner—John Petrakes
Attorney, Agent, or Firm—Sughrue, Rothwell, Mion, Zinn & Macpeak

[57] ABSTRACT

A radial tire having a tread portion, a pair of side portions extended to the tread portion, a pair of bead portions, a breaker and a carcass, wherein polyester cords obtained by applying a specifically limited twist to polyester yarns having a low polymerization degree to form a cord and subjecting the cord to a heat setting under a specifically limited condition, are used in the breaker. The resulting radial tire exhibits excellent cornering performance, high speed performance and tread wear resistance.

4 Claims, 1 Drawing Figure

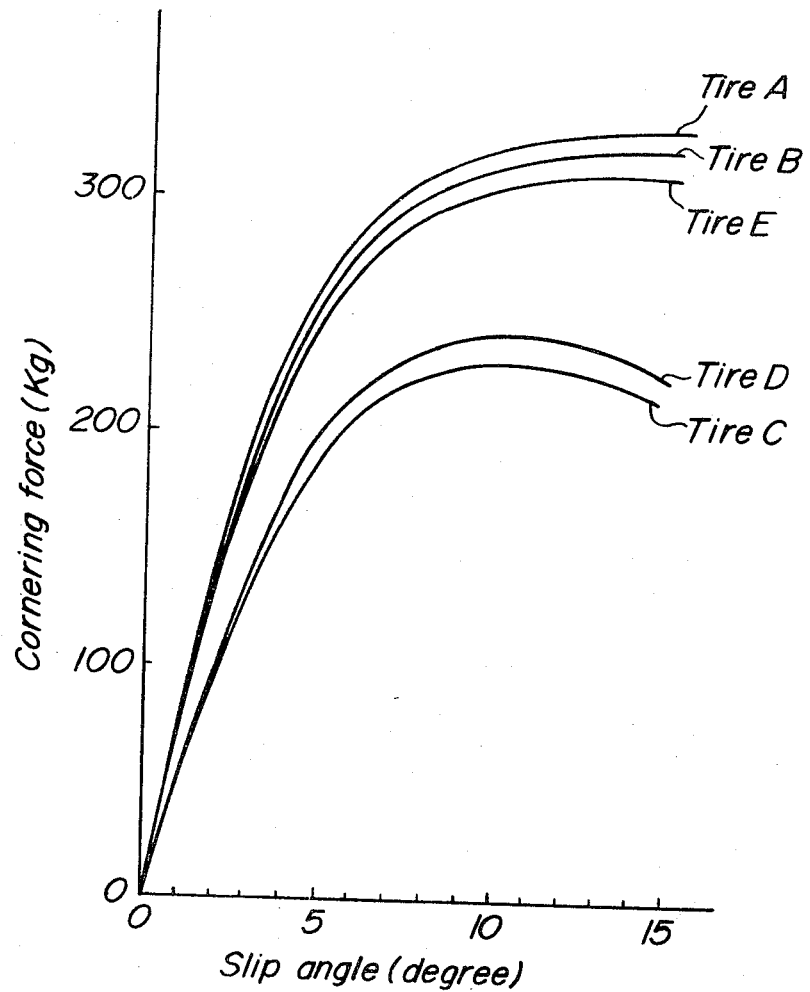

RADIAL TIRE HAVING POLYESTER CORD BREAKER

BACKGROUND OF THE INVENTION

1. Field of the Invention

The present invention relates to a radial tire having a tread portion, a pair of side portions extended to the tread portion at both the shoulders thereof, a pair of bead portions formed in the inner peripheries of the side portions respectively, a breaker formed inside the tread portion along its peripheral direction, and a carcass. More particularly, the present invention relates to a radial tire having an improved property, wherein polyester cords having a specifically limited low polymerization degree and a specifically limited twisting coefficient are used in the breaker.

2. Description of the Prior Art

In the radial tire, ply cords constituting the tire carcass are arranged in a direction substantially perpendicular to the direction of the rotation axis of the tire. Therefore, when the tire is applied with an internal pressure, such as air pressure, or with an external pressure due to impact, the carcass ply can only resist against the force in the radial direction. Accordingly, it is necessarily required that the carcass ply is reinforced in the direction perpendicular to the rotation axis of the tire, that is, in the equatorial direction of the tire, and therefore it is necessary to band a breaker round the carcass as a reinforcing layer. The effect of the breaker, which bands the radial carcass cords from the outside, is called a belt effect. Owing to the belt effect, radial tires are superior to bias tires in high speed performance, tread wear resistance, cornering performance, fuel economy and the like.

In the breaker of conventional radial tires, rayon cords or steel cords having a low elongation, i.e., having a high modulus, are used in order to develop fully the belt effect, but polyester (polyethylene terephthalate) cords, which are widely used in the carcass ply of general bias tires as an excellent tire cord, have not hitherto been used in the breaker of radial tire. The reason is as follows.

Polyester cord has various excellent properties, that is, it has a relatively high modulus, a high tenacity, non flat-spotting, a good heat resistance, a good wet resistance, and a low water absorption. Therefore, polyester cord can supplement the drawbacks of the above described rayon cord and steel cord. However, polyester cord has too low a modulus and too high a heat shrinkage to develop a satisfactory belt effect as a breaker of a radial tire.

Rayon cord, on the other hand, has a high water absorption, and therefore it absorbs water during the production of tire, and the high speed performance of the tire is decreased. Moreover, since rayon cord has a low tenacity, its durability against the impact load applied to the tire is insufficient.

Steel cord is unstable in its adhesion to rubber, and therefore the handling stability and the processability and productivity in the production of tire are low. Moreover, cars provided with tires reinforced with steel cords are uncomfortable to ride in.

SUMMARY OF THE INVENTION

The object of the present invention is to provide a radial tire wherein polyester cords which have not hitherto been used in the breaker of a radial tire are used in the breaker by improving the modulus and heat shrinkage of polyester cords, which are used widely in the carcass ply of a bias tire as an excellent tire cord.

The inventors have found that a polyester cord having a low polymerization degree has a low shrinkage due to its low polymerization degree, and when the cord is subjected to a heat setting under a proper condition, a polyester cord having both low shrinkage and a high modulus can be obtained.

The present invention relates to a radial tire having a tread portion, a pair of side portions extended to the tread portion at the shoulders thereof, a pair of bead portions formed in the inner peripheries of the side portions respectively, a breaker formed inside the tread portion along its peripheral direction, and a carcass, characterized in that polyester cords, which have been prepared by applying a specifically limited twist to polyester yarns having a low polymerization degree to form a cord, treating the cord with an adhesive which serves to adhere the cord with rubber, and then subjecting the cord to a heat setting under a specifically limited condition, are used in the breaker. That is, the essential feature of the present invention lies in that polyester cords prepared in the follwoing manner are used in the breaker of the above described radial tire. A plurality of yarns, each of which is a bundle of a large number of filaments consisting of polyester having a low polymerization degree and having an intrinsic viscosity of 0.3–0.8 measured in ochlorophenol at 25°C, are twisted to form a cord at a twisting coefficient of 0.15–0.45, said twisting coefficient being represented by the following formula $$N_T = N \times \sqrt{0.139 \times D/\rho} \times 10^{-3}$$

wherein $N_T$ is twisting coefficient, $N$ is number of cable twists per 10 cm of cord, $D$ is one-half of total deniers of cord and $\rho$ is specific gravity of fiber, the cord is applied with an adhesive which serves to adhere the cord with rubber and then subjected to a heat setting at a temperature of 230°–255°C for 2–4 minutes under a tension of 0.15–1.0 g/denier.

The polyester cord to be used in the present invention has a polymerization degree lower than that of a conventional polyester cord. Namely, when the polymerization degree of polyester is too high, the polyester cord has a low modulus and a considerably high shrinkage while when the polymerization degree is too low, the polyester cord has a considerably low tenacity. Therefore, the proper range of the polymerization degree of polyester is within such a range that the intrinsic viscosity $[\eta]$ measured in o-chlorophenol at 25°C is 0.3–0.8, preferably 0.4–0.75, most preferably 0.5–0.7.

The intrinsic viscosity used in the measurement of the polymerization degree of polyester is a viscosity obtained by extrapolating relative viscosities of the polyester, which are measured in o-chlorophenol solutions containing the polyester in several concentrations, at 0 concentration. The higher the intrinsic viscosity, the higher the polymerization degree.

The polyester cord to be used in the present invention is preferred to be a multifilament cord obtained by twisting a plurality of yarns, each of which is a bundle of a large number of fine filaments of 1–8 deniers. The denier of each yarn (the number of the filaments) and the number of yarns to be twisted are determined depending upon the use purpose, but in general, the denier of yarn is 1,000–2,200 deniers and the number of yarns to be twisted is 2–3.

When a plurality of yarns are twisted to produce a cord, if the twisting coefficient is low, the resulting cord has a considerably poor sizing property and the filaments move independently, and further the adhesive does not penetrate uniformly between the filaments. As a result, the cord is apt to be separated from the rubber during the running of the tire, the fatigue resistance of the cord is decreased considerably, and the workabilities in the weaving, treatment with an adhesive and heat treatment are decreased. On the other hand, when the twisting coefficient is too high, the resulting cord has considerably low modulus and tenacity. The twisting coefficient of the cord to be used in the present invention is represented by the following formula $$N_T = N \times \sqrt{0.139 \times D/\rho} \times 10^{-3}$$

wherein $N_T$ is twisting coefficient, N is number of cable twists per 10 cm of cord, D is one-half of total deniers of cord, and $\rho$ is density of fiber, and is within the range of 0.15–0.45, preferably 0.20–0.40, most preferably 0.25–0.35.

The twisting coefficient is not influenced by the kind, property and denier of fibers, and in the same fiber, the higher the twisting coefficient, the larger the number of twists.

In the present invention, either so-called balance twist wherein the number of cable twists and that of ply twists are the same, or so-called unbalance twist wherein the number of cable twists and that of ply twists are different, may be used. However, since the physical property of cord is generally influenced by the number of cable twists, even when there is a large difference between the number of cable twists and that of ply twists, the effect of such large difference does not appear.

The cord obtained by the twisting is treated with an adhesive, which serves to adhere the cord to the rubber, and then subjected to a heat setting. However, when the heat setting condition is not proper, the cord cannot function effectively as a breaker of a radial tire.

Among the heat setting conditions, when the heat setting temperature is too low, a satisfactory effect of the heat setting cannot be obtained, while when the temperature is too high, a satisfactory effect of the heat setting can be obtained, but the tenacity of the cord is considerably decreased, and further the productivity of the cord is decreased. Accordingly, the proper heat setting temperature is 230°–255°C, preferably 235°–250°C. The proper heat setting time is 0.5–5 minutes, preferably 2–4 minutes. The tension is kept at a proper value depending upon the heat setting temperature. However, when the tension is too low, the modulus of the cord cannot be increased satisfactorily, while when the tension is too high, the modulus of the cord can be increased satisfactorily, but the heat shrinkage of the cord becomes high. Accordingly, the proper tension is 0.15–1.0 g, preferably 0.3–0.7 g, per 1 denier of the cord.

The radial tire, in which the polyester cord according to the present invention is used in the breaker, can be produced in a conventional method.

According to the present invention, polyester cords which have not hitherto been used in the breaker of a radial tire due to their poor belt effect, can be so used.

The polyester cord to be used in the breaker of the radial tire according to the present invention has characteristics of conventional polyester cord and further has a higher modulus than that of rayon cord, which has hitherto been used in the breaker of radial tire and has exhibited a satisfactory belt effect due to its high modulus. Therefore, since the radial tire according to the present invention uses polyester cord having a high modulus and a low heat shrinkage in the breaker, the belt effect of the radial tire of the present invention is superior to that of a conventional radial tire which uses rayon cord in the breaker, and further since the polyester cord has excellent tenacity and water disabsorption, the radial tire of the present invention has remarkably good cornering performance, high speed performance, tread wear resistance and fuel economy.

BRIEF DESCRIPTION OF THE DRAWING

For a better understanding of the invention, reference is taken to the accompanying drawing, wherein:

The single FIGURE is a graph showing the cornering performances of radial tires tested in the following Example 4.

DESCRIPTION OF PREFERRED EMBODIMENTS

The following examples are given in illustration of this invention and are not intended as limitations thereof.

EXAMPLE 1

Polyester cord to be used in the radial tire of the present invention was produced in the following manner. Two polyester yarns, each having a fineness of 1,000 deniers and an intrisnic viscosity [$\eta$] of 0.3–0.8 as shown in the following Table 1 measured in o-chlorophenol at 25°C in a conventional manner, were subjected to a ply twist of 20 turns/10 cm to prepare a ply-twisted yarn. This ply-twisted yarn and another ply-twisted yarn prepared in the same manner were subjected to a cable twist of 20 turns/10 cm to obtain a cord of 1,000 d//2/2. All the resulting cords had a twisting coefficient of 0.28. The cord was dipped in an adhesive which serves to adhere the cord with rubber. Then the cord was heat set at 245°C for 3 minutes under a tension of 2.0 Kg/cord (0.5 g/denier).

A comparative polyester cord was produced in the following manner. Polyester yarns having a fineness of 1,000 deniers and an intrinsic viscosity [$\eta$] of 0.93, which are used in the carcass ply of conventional radial tires, were twisted to form a cord, and the cord was treated with an adhesive and heat set under the exactly same conditions as described above to produce a comparative polyester cord.

A conventional rayon cord was produced in the following manner. Three yarns, each having a fineness of 1,650 deniers were twisted at a ply twist of 29 turns/10 cm and a cable twist of 29 turns/10 cm to prepare a cord of 1,650 d/3, and the cord was heat set and treated with an adhesive in a conventional manner to produce a conventional rayon cord.

Physical properties of the above obtained cords are shown in Table 1.

The physical properties were measured according to the following method.

1. Intrinsic viscosity:

As a solvent for measuring the intrinsic viscosity, o-chlorophenol having a purity of higher than 99 percent and a water content of less than 0.18 percent is used.

Oil contained in a polyester yarn is extracted with methyl alcohol (first grade reagent, fraction at 64°–66°C is more than 95 percent by weight) by means of a Soxlet extractor, and then the yarn is dried under a reduced pressure.

The thus treated yarn is dissolved in the above described o-chlorophenol and the flow-down time of the solution is measured by means of a modified Ostward-Nakano B type viscosimeter placed in a thermostat kept at 25±0.1°C in a conventional manner. Solutions having 4 different concentrations are prepared, and from the flow-down time of each solution and the flow-down time of the o-chlorophenol only, the relative viscosity (generally represented by $\eta_{rel}$) of the solution at each concentration is calculated, and the intrinsic viscosity is calculated from the relative viscosities.

2. Tenacity:

A sample cord having a length of 25 cm is drawn at a rate of 300 mm/min until the cord was broken by means of an Autograph (type IS 2000) made by Shimazu Co., and the tenacity at the breakage of the cord is measured.

3. Modulus:

The modulus is measured by drawing a sample cord having a length of 25 cm at a rate of 300 mm/min. by means of an Autograph (type IS 2000) made by Shimazu Co.

4. Dynamic modulus:

Dynamic modulus is measured by means of a spectrometer made by Iwamoto Seisakusho under the following condition.

| Measuring temperature: | 100°C |
| Frequency: | 100 cycles/sec. |
| Static load: | 2.0 Kg/cord |
| Dynamic load: | 0.7 Kg/cord |
| Sample length: | 3 cm |

5. Heat shrinkage:

A sample cord having a certain length is left to stand in an oven for 30 minutes at 177°C under no load. The heat shrinkage is shown by the percentage of apparent loss of the length calculated by the following formula Heat shrinkage (%) = $l_0 - l_1 / l_0 \times 100$ wherein $l_0$ designates the length of the sample cord before the treatment and $l_1$ designates the length of the sample cord after the treatment.

As seen from Table 1, the polyester cords according to the present invention are somewhat inferior in the tenacity but are remarkably superior in the modulus and heat shrinkage to the comparative polyester cord. Further, the cords of the present invention are somewhat inferior in the heat shrinkage but are remarkably superior in the modulus and tenacity to the rayon cord.

EXAMPLE 2

In the production of polyester cord sample No. 5 described in Example 1, the twisting condition was varied as shown in the following Table 2, but the heat setting condition and other conditions were not varied. Physical properties of the resulting cords were tested according to the test method described in Example 1 to obtain a result as shown in Table 2.

In Table 2, the fatigue resistance was calculated as follows. The tenacity maintaining percentage of each polyester cord after running in the road test was measured, and the ratio of the tenacity maintaining percentage of each cord to that of the cord produced at a twisting coefficient ($N_T$) of 0.28 was calculated and multiplied by 100.

Table 1

| Sample No. | 1 | 2 | 3 | 4 | 5 | 6 | 7 | 8 | 9 |
|---|---|---|---|---|---|---|---|---|---|
| Sample | Polyester cord (Present invention) | | | | | | | Polyester cord (Comparative) | Rayon cord (Conventional) |
| Intrinsic viscosity of yarn [$\eta$] | 0.3 | 0.4 | 0.5 | 0.55 | 0.68 | 0.75 | 0.8 | 0.93 | |
| Tenacity (g/d) | 4.5 | 5.7 | 6.0 | 6.5 | 6.9 | 7.1 | 7.2 | 7.5 | 4.8 |
| Modulus (Kg/cord) (g/d) | 500 / 125 | 500 / 125 | 500 / 125 | 480 / 120 | 440 / 110 | 400 / 100 | 360 / 90 | 340 / 85 | 396 / 80 |
| Dynamic modulus (100°C) (dyne/cm²) | $1.35\times10^{11}$ | $1.35\times10^{11}$ | $1.35\times10^{11}$ | $1.3\times10^{11}$ | $1.2\times10^{11}$ | $1.1\times10^{11}$ | $1.0\times10^{11}$ | $0.9\times10^{11}$ | $1.0\times10^{11}$ |
| Heat shrinkage (177°C) (%) | 1.5 | 1.7 | 2.1 | 2.1 | 2.5 | 3.0 | 3.3 | 4.5 | 2.0 |

Table 2

| Twisting coefficient ($N_T$) | 0.1 | 0.15 | 0.20 | 0.28 | 0.35 | 0.40 | 0.45 | 0.50 |
|---|---|---|---|---|---|---|---|---|
| Tenacity (g/d) | 7.5 | 7.3 | 7.2 | 6.9 | 6.5 | 6.0 | 5.7 | 5.0 |
| Modulus (g/d) | 120 | 118 | 115 | 110 | 100 | 95 | 87 | 80 |
| Fatigue resistance | 70 | 90 | 95 | 100 | 110 | 113 | 113 | 110 |

As seen from Table 2, when the twisting coefficient is lower than 0.15, the resulting cord is poor in the fatigue resistance, while when the twisting coefficient is higher than 0.45, the cord is low tenacity and modulus.

EXAMPLE 3

In the production of polyester cord sample No. 5 described in Example 1, the heat setting condition was varied as shown in the following Table 3, but the twisting condition and other conditions were not varied. Physical properties of the resulting cords were tested according to the test method described in Example 1 to obtain a result as shown in Table 3.

Table 3

| Heat setting condition | | | | | | | | |
|---|---|---|---|---|---|---|---|---|
| Temperature (°C) | 220 | 230 | 235 | 240 | 245 | 250 | 255 | 260 |
| Time (min.) | 3 | 3 | 3 | 3 | 3 | 3 | 3 | 3 |
| Tension (g/d) | 0.5 | 0.5 | 0.5 | 0.5 | 0.5 | 0.5 | 0.5 | 0.5 |
| Tenacity (g/d) | 8.0 | 7.5 | 7.2 | 6.9 | 6.9 | 6.5 | 6.0 | 4.5 |
| Modulus (g/d) | 75 | 90 | 93 | 100 | 110 | 113 | 115 | 120 |
| Heat shrinkage (%) | 4.3 | 3.5 | 3.0 | 2.8 | 2.5 | 2.0 | 1.7 | 1.3 |

As seen from Table 3, when the heat setting temperature is lower than 230°C, the resulting cord is low in modulus and high in heat shrinkage, while when the heat setting temperature is higher than 255°C, the cord is low in tenacity.

EXAMPLE 4

Radial tires A–E having the following structure:

tire size: 175-14
breaker: 4 breakers
cord angle: 30° against the equatorial plane of tire
carcass: conventional 2 plies polyester cord (1,000 d/2)
cord angle: 90° against the equatorial plane of tire were produced by using the cords described in Example 1 in the breaker, and performances of the tires were tested.

1. Sample tire
   a. Tire A (present invention)
   Polyester cord of the present invention (sample No. 4 in Example 1) is used in the breaker.
   b. Tire B (present invention)
   Polyester cord of the present invention (sample No. 5 in Example 1) is used in the breaker.
   c. Tire C (Comparative)
   Polyester cord, which is produced under the same condition as described in the polyester cord sample No. 5 in Example 1, except that the twisting coefficient and the heat setting temperature are outside the scope of the present invention, is used in the breaker. In this polyester cord, the twisting coefficient is 0.48, and the heat setting temperature is 225°C.
   d. Tire D (Comparative)
   Polyester cord having a high polymerization degree (sample No. 8 in Example 1), which has hitherto been used in a conventional bias tire, is used in the breaker.
   e. Tire E (Conventional)
   Rayon cord (sample No. 9 in Example 1) is used in the breaker.

2. Test method.
   a. Cornering performance:
   The cornering performance of tire is represented by the cornering force. When a slip angle is given to a tire, the car naturally begins to turn and a centrifugal force is produced by the turning movement. The cornering force is a force which is caused by a frictional force between the tire and the road surface against the centrifugal force in a direction perpendicualr to the rotating plane of the tire. The cornering force is measured by means of a drum tester. The centrifugal force at the turning movement of a car is represented by the formula
   (weight of the car)×(speed)²/(turning radius).
   Therefore, as a tire has a higher cornering force, the tire can turn at a higher speed and a smaller turning radius under a heavier load. That is, the car has a good cornering performance.
   b. High speed performance:
   The high speed performance is measured by running a car on a drum tester under a certain load.

A car is firstly run at a speed of 100 Km/hr. for 10 minutes, then the speed is increased by 10 Km/hr., i.e., up to 110 Km/hr., and the car is run at this speed for 10 minutes, and then the speed is increased by 10 Km/hr., i.e., up to 120 Km/hr. These steps are repeated stepwise up to 200 Km/hr. by increasing the speed by 10 Km/hr. in each step. At a speed over 200 Km/hr., the speed is increased stepwise by 5 Km/hr. in each step at the same intervals of time. The speed when the tire is broken under the test condition that the internal pressure of the tire is 2.1 Kg/cm² and the load is 450 Kg, and the running time at the speed are measured. As the speed when the tire is broken and the running time at the speed are larger, the high speed performance of the tire is higher.

c. Tread wear resistance:

A road test is effected under the following condition:

| | |
|---|---|
| Load per 1 tire: | about 400 Kg |
| Internal pressure of tire: | 2.0 Kg/cm² |
| Average speed: | about 40 Km/hr |
| Road: | good city road |

After 40,000 Km running, the tread wear is measured, and the running distance per 1 mm of tread wear is calculated.

3. Results of the tests.

The cornering performance is shown in the FIGURE of the accompanying drawing, and the high speed performance and tread wear resistance are shown in the following Table 4.

Table 4

| Sample Tire | Tire A (Present invention) | Tire B | Tire C (Comparative) | Tire D | Tire E (Conventional) |
|---|---|---|---|---|---|
| High speed performance Speed at the break of tire (Km/hr.) | 240 | 235 | 205 | 220 | 215 |
| Running time at the speed (min.) | 5 | 8 | 7 | 3 | 7 |
| Tread wear resistance Running distance per 1 mm tread wear (Km) | 11,400 | 9,700 | 6,150 | 6,950 | 8,800 |

When the handling and the safeness of the tires were tested by a road test, the results agreed with those obtained in the drum test.

In any of the above described tests, radial tires A and B of the present invention are remarkably superior to comparative radial tire D, wherein conventional polyester cords having a high polymerization degree are used in the breaker. Further, radial tires A and B of the present invention are superior to conventional radial tire E, wherein rayon cords are used in the breaker, and particularly tires A and B are superior to tire E in high speed performance. Comparative radial tire C, wherein polyester cords whose polymerization degree is the same as the polyester cord of the present invention but whose twisting condition and heat setting condition are outside the scope of the present invention are used, is very poor in performance.

What is claimed is:

1. In a radial tire having a tread portion, a pair of side portions extended to the tread portion at both the shoulders thereof, a pair of bead portions formed in the inner peripheries of the side portions respectively, a breaker formed inside the tread portion along its peripheral direction, and a carcass, the improvement characterized by:
   a. the breaker comprising adhesive treated, heat set polyester cords formed of twisted yarns,
   b. each yarn comprising a bundle of a plurality of filaments consisting of polyester having a low polymerization degree and an intrinsic viscosity of 0.3–0.8 measured in o-chlorophenol at 25°C,
   c. the twisting being performed at a twisting coefficient ($N_T$) of 0.15–0.45, said twisting coefficient being expressed by the following formula:

$$N_T = N \times \sqrt{0.139 \times D/\rho} \times 10^{-3}$$

wherein $N$ is the number of cable twists per 10 cm of cord, $D$ is one-half of the total deniers of cord, and $\rho$ is the density of fiber, d. the cords being treated with an adhesive to implement their adherance to rubber, and
   e. the heat setting being performed at a temperature of 230°–255°C for 2–4 minutes under a tension of 0.15–1.0 g/denier.

2. The radial tire as claimed in claim 1, wherein said polyester cord has an intrinsic viscosity of 0.4–0.75 measured in o-chlorophenol at 25°C.

3. The radial tire as claimed in claim 1, wherein said polyester cord has a twisting coefficient of 0.20–0.40.

4. The radial tire as claimed in claim 1, wherein said polyester cord is heat set at a temperature of 235°–250°C for 2–4 minutes under a tension of 0.3–0.7 g/denier.

* * * * *